United States Patent [19]

Hudson

[11] E Re. 29,384

[45] Reissued Sept. 6, 1977

[54] EXPANDING FILL SPOUT FOR BAG FILLING MACHINE

[75] Inventor: Doyle R. Hudson, West Monroe, La.

[73] Assignee: Olinkraft, Inc., West Monroe, La.

[21] Appl. No.: 601,248

[22] Filed: Aug. 1, 1975

Related U.S. Patent Documents

Reissue of:

[64] Patent No.: 3,750,721
Issued: Aug. 7, 1973
Appl. No.: 172,688
Filed: Aug. 18, 1971

[51] Int. Cl.[2] ..... B65B 1/04

[52] U.S. Cl. ..... 141/10; 141/114; 141/317; 53/187; 53/386

[58] Field of Search ..... 53/187, 188, 386; 141/10, 67, 68, 114, 136, 140, 148, 149, 150, 165, 172, 253, 257, 262, 263, 269, 220, 94, 281, 156, 157, 275-278, 311-317

[56] References Cited

U.S. PATENT DOCUMENTS 2,689,073 9/1954 Twigg ..... 53/187

FOREIGN PATENT DOCUMENTS 757,480 4/1967 Canada ..... 141/313

*Primary Examiner*—Houston S. Bell, Jr.
*Attorney, Agent, or Firm*—Pugh & Keaty, Ltd.

[57] ABSTRACT

An improved filling machine of the type having an expanding fill spout comprising at least two split sleeves pivotally mounted around a circular filling spout. The improved filling machine also contains new and novel automatic means for holding the bag on the fill spout and means for detecting the presence or absence of a bag on the fill spout. The split sleeves and the means for holding the bag on the fill spout are interconnected by means of levers and other mechanical connections for unit operation by at least one power cylinder or other power means.

8 Claims, 3 Drawing Figures

INVENTOR
DOYLE R. HUDSON
BY Norwell E. Van Behren
ATTORNEY

INVENTOR
DOYLE R. HUDSON

BY Norwell E. Van Behren
ATTORNEY

EXPANDING FILL SPOUT FOR BAG FILLING MACHINE

Matter enclosed in heavy brackets [ ] appears in the original patent but forms no part of this reissue specification; matter printed in italics indicates the additions made by reissue.

*CROSS REFERENCES TO RELATED APPLICATIONS*

*U.S. Pat. No. 3,698,451, issued Oct. 17, 1972 to Doyle R. Hudson and entitled "Automatic Bag Opening and Filling Apparatus".*

*U.S. Pat. No. 3,755,986, issued Sept. 4, 1973, to Doyle R. Hudson and entitled "Gussett Reformer".*

*U.S. Pat. No. 3,796,300, issued Mar. 12, 1975, to Doyle R. Hudson and entitled "Multiple Finger Pushers".*

BACKGROUND OF THE INVENTION

This invention relates to a filling machine for filling a bag or other object with a plurality of items contained within a filling spout positioned above the filling machine. More particularly the invention relates to an improved filling machine having a new and novel expanding fill spout which comprises at least two split sleeves which are pivotally mounted around the filling spout. The split sleeves are pivotally connected by mechanical means to a new and novel means for holding the bag in place on the split sleeve during the filling operation.

In the operation of filling large and bulky objects in a bag, such as charcoal briquets commonly used in outdoor cooking, the problem of coordinating the filling operation with the placement of the bag to be filled on the fill spout has long been felt. Prior art filling machines, within the inventor's knowledge, consisted of a solid fill spout formed on the bottom portion of a generally conical shaped filling container into which was automatically placed the proper amounts of materials to be filled in the bag. In order to properly position the bag [or] *on* the solid filling spout, the operator would open the bag by hand and position the bag around the spout. This required the spout to be considerably smaller than the diameter of the bag so that the operator could attain the necessary speed in opening the bags and positioning them over the spout. Such crude hand operation often required the fill spout to be in the range of forty percent smaller than the [oepning] *opening* of the bag which of course limited the amount of material that could be filled in the bag in passing through the fill spout and into the bag over a given period of time.

Another problem encountered with the hand filling operation of the inventor's knowledge was the use of the smaller fill spout opening which caused a bridging of the articles being filled within the spout. Since the opening was considerably smaller than the bag diameter, the objects being filled, such as charcoal, would tend to hang up within the fill spout thereby slowing down the filling operation or resulting in a bag which was either overfilled or underfilled, depending upon the timing sequence in the filling circuit.

In order to overcome these difficulties and others inherent in the prior art, the new and novel improved filling machine of the subject invention comprises means for positioning the bag below the filling spout in combination with means for automatically opening the bag and positioning the bag around the filling spout. The new and novel filling spout of the subject invention comprises at least two split sleeves which are pivotally mounted so that upon positioning of the split sleeves around the filling spout and within the bag, the filling opening within the machine is greatly enlarged over the prior art thereby allowing the bag to be rapidly filled without the bridging and hangup problems before mentioned and encountered in the prior art manual filling machines.

Accordingly it is an object of this invention to provide a new and novel filling machine for use in filling a bag with a plurality of objects contained within the filling machine whereby new and novel means are provided for opening the bag to be filled and positioning the neck of the bag around the filling spout.

Another object of the invention is to provide a new and novel filling machine having means for holding the bag to be filled on the filling spout while the objects are filled in the bag.

Still another object of the invention is to provide a new and novel filling machine of the type wherein a greater number of objects may be filled per hour resulting from the new and novel structure of the filling machine of the present invention.

Yet another object of the invention is to provide a new and improved filling machine which eliminates hangups and bridgings of the objects to be filled within the filling spout thereby providing a more evenly filled bag and avoiding over and underfilling of the bag.

These and other objects and advantages of the invention will become immediately apparent from a study of the drawings submitted herewith and from a review of the description of the preferred embodiment.

DESCRIPTION OF THE PREFERRED EMBODIMENT

Figure 1:
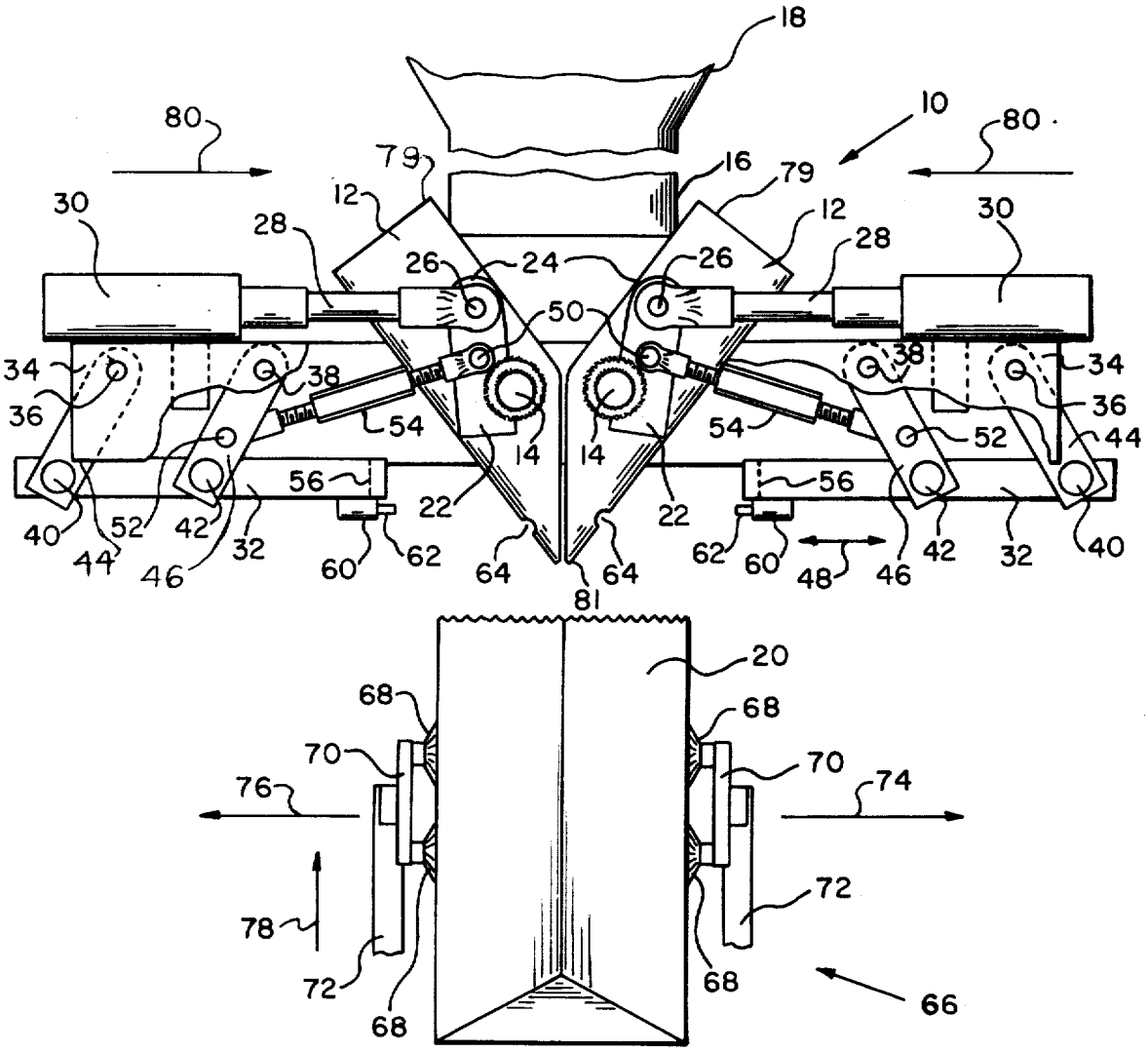
FIG. 1 is a side view of the new and novel filling machine of the subject invention showing the bag to be filled prior to its being positioned over the new and improved filling spout of the invention.

Referring now to the drawings in general and particularly to FIG. 1 of the drawings, there is shown the new and novel filling machine of the invention generally by the numeral 10 and comprises a filling spout 12 in the form of at least two split sleeves which are pivotally mounted by means of pivot pins 14 which are fixedly attached to a structural frame, not shown in the drawings, by means well known in the art and forming no part of this invention. The split sleeve filling spouts 12 have a circular troughlike configuration and are designed to be positioned over the bottom portion 16 of a generally conical shaped filling bin 18 into which the objects are placed for filling into the bag 20.

Fixedly attached to the pivot pins 14 are pivot link bars 22 as shown in FIG. 1. The pivot link bars 22 are pivotally connected at the end 24 by means of pivot pins 26 to a rod 28 and a power cylinder 30.

Slideably mounted beneath the power cylinders 30 are slide plate blocks 32 which are mounted, by means well known in the art and forming no part of this invention, to a frame 34 which is in turn fixedly attached to the structural frame as hereinbefore mentioned. The slide plate blocks 32 are pivotally mounted to the frame 34 by means of pivot pins 36 and 38 and by means of pivot pins 40 and 42 in combination with pivot bars 44 and 46. By the use of the similar pivot bars 44 and 46 pivotally mounted to the frame 34 by the pivot pins 36 and 38, a horizontal motion in the direction of arrow 48 is obtained for the slide plate blocks 32.

Also pivotally mounted to the pivot link bar 22 by means of the pivot pin 50 and to the pivot bar 46 by means of the pivot pin 52 is a turnbuckle 54 which is used to adjust the timing relationship of the movement of the split sleeve filling spout 12 with the slide plate blocks 32 whenever the slide plate blocks 32 horizontally move to clamp the bag 20 over the split sleeve fill spouts 12.

Figure 2:
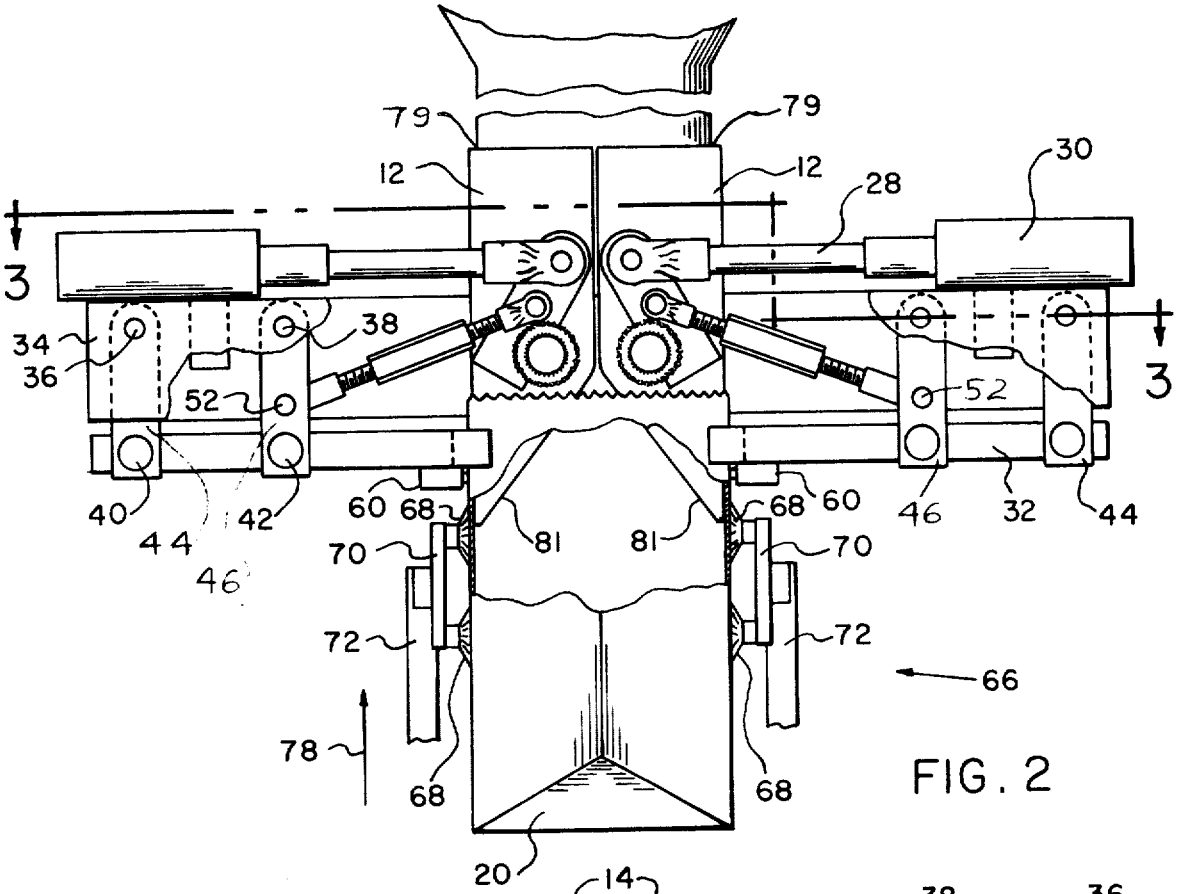
FIG. 2 is a side view partially broken away of the same new and novel filling machine showing the bag to be filled after being positioned over the new and improved filling spout of the invention.
Figure 3:
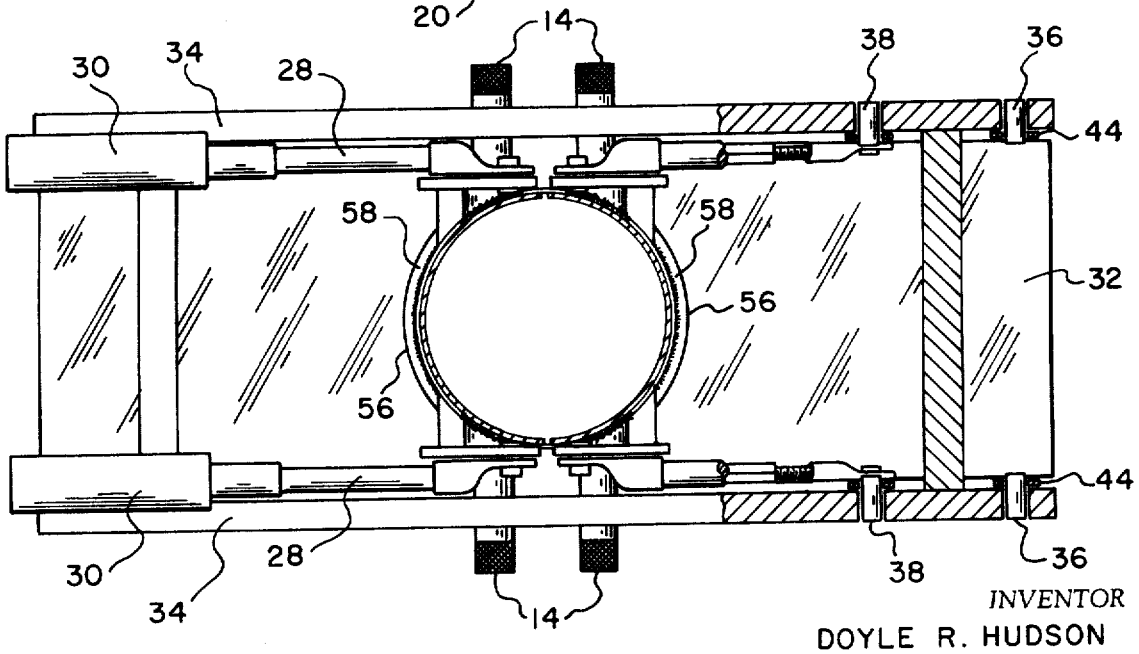
FIG. 3 is a top sectional view taken through the split sleeve filling spout taken along line 3—3 of FIG. 2.

The slide plate blocks 32 have formed on the inner end thereof an arcuate surface 56 more clearly shown in FIG. 3 of the drawings. Rigidly attached to the arcuate surface 56 is a grip pad 58 formed of rubber or some other flexible material which is used to assure adequate frictional contact against the bag 20 whenever the bag 20 is positioned over the split sleeve filling spouts 12 as shown in FIG. 2 of the drawings.

Rigidly attached to the bottom portion of the slide plate blocks 32 are detecting means 60 in the form of a microswitch or some other suitable electrical device having a sensing pin 62 contained on the end thereof and connected internally in the microswitch for the on-off operation of the microswitch as is well known in the art. The split sleeve filling spout 12 has formed on the lower end thereof a hole 64 which is positioned in such a manner that whenever the split sleeve filling spout 12 is positioned around the bottom portion 16 of the filling bin 18 as shown in FIG. 2, the sensing pin 62 will sense the presence or absence of a bag 20 positioned over the split sleeve filling spout 12.

Referring now particularly to FIGS. 1 and 2 of the drawings there is shown generally by the numeral 66 the means for positioning the bag 20 to be filled underneath the split sleeve filling spout 12 prior to operation of the filling machine. The positioning means may comprise a plurality of air suction cups 68 fixedly attached to a bar 70 and 72 and remotely attached to an air source not shown in the drawings. The positioning means per se form no part of this application except when used in combination with the new and novel filling spout as hereinbefore described and are shown here only for the purposes of illustration of the preferred embodiment.

In operation, the bag 20 to be filled is positioned underneath the split sleeve filling spout 12 by the positioning means 66 which contain the plurality of suction cups 68 as before mentioned which operate to open the bag 20 whenever the positioning means are horizontally moved in the direction shown by the arrows 74 and 76. When the bag 20 is properly positioned beneath the split sleeve filling spout 12 and is partially opened by means of the suction cups 68, the positioning means 66 will travel upwardly in the direction shown by arrow 78 with the bag being positioned over the split sleeve filling spout 12 in the manner and position shown in FIG. 2 of the drawing. Simultaneously with the positioning of the bag 20 over the split sleeve filling spout 12 the power cylinder 30 will extend in the direction shown by the arrow 80 to position the upper portion 79 split sleeve filling spout 12 around the bottom portion 16 of the filling bin 18 as well as the lower portion 81 within the bag 20 as shown in FIG. 2 of the drawings. After the split sleeve filling spout 12 is in this position the slide plate block 32, with grip pads 58 attached, will slide inwardly in the direction shown by the arrow 48 due to the delay in timing resulting from the relative position of the pivot link bar 22 and the pivot bar 46 in combination with the position of the turnbuckle 54.

In the event that the positioning means 66 moves upwardly in the direction shown by the arrow 78 without having a bag 20 attached to the suction cups 68 then the sensing pins 62 will be positioned in the hole 64 to actuate a means for stopping the flow of objects to be filled in the bag 20 into the filling bin 18. Whenever the bag 20 is completely filled, as determined by means forming no part of this invention, then the power cylinders 30 are operated to retract the split sleeve filling spout 12 from the position shown in FIG. 2 to the position shown in FIG. 1 and the filled bag 20 may be removed from the filling machine.

From the above, it can be seen that there has been provided by the subject invention new and novel means for effecting the rapid filling of a bag by the use of at least two split sleeve filling spouts which permit a more rapid filling of the bag thereby preventing bridging of the objects to be filled within the filling bin. As a result, the bags to be filled may be filled at a more rapid rate with a more uniform content thereby requiring less costly downtime of the filling machine due to over or under filling of the bag as occurred in prior art filling machines. While the subject invention accomplishes the objects and advantages herein stated, it should become readily apparent that many changes may be made in the details of construction of the filling machine without departing from the spirit and scope of the invention as expressed in the accompanying claims and the invention is not to be limited to the exact matter shown and described since only the preferred embodiments have been given by way of illustration only.

Having defined my invention I claim:

1. A filling machine of the type for filling a bag with a plurality of objects contained within a filling spout comprising a combination of:

a. a frame;

b. means, carried by the frame, for positioning the bag below the filling spout;

c. *first* automatic means, carried by the frame, for raising the bag upwardly towards the filling spout while opening the bag and positioning the bag around the filling spout, *said first automatic means for opening and positioning comprising in part at least two split sleeves pivotally mounted below the filling spout for opening the bag and surrounding the filling spout;* d. *second* automatic means, carried by said frame, for holding the upper portion of the raised bag on the spout while the objects are filled in the raised bag, the objects being filled in the raised bag serving to completely open the lower portion of the raised bag while the upper portion is held on the holding means[; and] , *said second automatic means for holding the bag on the spout comprising horizontally driven clamping means positioned around said split sleeves for firmly clamping the bag against said split sleeves while the bag is being filled after being horizontally driven against said split sleeves;* e. *release* means, carried by the frame, for releasing the held bag and allowing it to be removed downwardly away from the filling spout*; and*

*f. at least one drive means carried by said frame for positively moving at least said clamping means in a horizontal direction against said split sleeves.*

[2. The filling machine is defined in claim 1 wherein said automatic means for opening and positioning comprises in part:

a. at least two split sleeves pivotally mounted below the filling spout for opening the bag and encircling the circular filling spout.]

[3. The filling machine as defined in claim 2 wherein said automatic means for holding the bag on the spout comprises clamping means positioned around said split sleeves for firmly clamping said bag against said split sleeves while the bag is being filled.]

4. The filling machine as defined in claim [3] *1* wherein said split sleeves are pivoted by a power cylinder, said power cylinder also serving to actuate said clamping means [after said split sleeves are pivoted].

[5. The filling machine as defined in claim 4 further comprising the pivot of said split sleeves being adjustable in a horizontal direction outward from the vertical axis of the filling spout to accommodate a plurality of bag sizes.]

6. The filling machine as defined in claim [5] *1* further comprising detecting means fixedly attached to said clamping means to detect the presence of a bag on the split sleeve to control the product flow so that accidental discharge of the objects through the filling machine does not occur.

7. The filling machine as defined in claim 6 wherein [sad] *said* detecting means comprises an electrical switch mounted on pin fixedly attached to said clamping means and operable to engage a mating hole contained on one of said split sleeves whenever a bag is absent from said split sleeves.

8. A method for rapidly and automatically filling a bag with a plurality of objects from a *split sleeve* filling spout *with clamps positioned about it* comprising the steps of:

a. positioning the bag below the *split sleeve* filling spout;

b. automatically raising the bag upwardly towards the *split sleeve* filling spout while opening the bag and positioning the upper portion of the bag around the *split sleeve* filling spout;

c. automatically *pivoting the split sleeves of the filling spout outwardly while horizontally and positively driving the clamps inwardly against the bag and hence the bag against the outwardly pivoted split sleeves and thereby* holding the upper portion of the raised bag around the *split sleeve* filling spout *in positively driven clamping engagement* while detecting the presence of a bag around the filling spout;

d. filling the raised bag when the detector signals the presence of a raised bag around the *split sleeve* filling spout;

e. releasing the held bag and removing the filled bag downwardly away from around the filling spout.

*9. The filling machine as defined in claim 1 wherein the split sleeve fill spout remains substantially stationary in a vertical direction and the vertical centerline thereof remains at least substantially stationary in a horizontal direction.*

*10. The filling machine of claim 4 wherein said drive means further comprises:*

*slide plate blocks slidably and pivotally mounted to said frame by means of pivot pins in combination with pivot bars;*

*wherein said first automatic means includes split sleeve pivot pins by which said split sleeves are pivotably mounted to said frame and at least one pivot link bar to which said power cylinder is attached at a point above said split sleeve pivot pins to drive said pivot link bar; and*

*wherein there is further included an adjustable member attached between and mechanically connecting said pivot link bar to said pivot bars; whereby said power cylinder drives both said split sleeves and said clamping means, the former outwardly and the latter inwardly.*

*11. The method of claim 8 wherein during steps "a" through "e" said split sleeve fill spout is held at least substantially stationary in a vertical direction and the vertical centerline of said split sleeve fill spout is held stationary in a horizontal direction.*

* * * * *